(12) United States Patent
Belgum et al.

(10) Patent No.: US 7,253,575 B2
(45) Date of Patent: Aug. 7, 2007

(54) INDUSTRIAL OPTICAL SHUTTER

(75) Inventors: Jack Belgum, San Anselmo, CA (US); Ximin Wang, Petaluma, CA (US); Dale Flaming, Novato, CA (US)

(73) Assignee: Sutter Instrument Company, Novato, CA (US)

( * ) Notice: Subject to any disclaimer, the term of this patent is extended or adjusted under 35 U.S.C. 154(b) by 0 days.

(21) Appl. No.: 10/983,441

(22) Filed: Nov. 8, 2004

(65) Prior Publication Data

US 2006/0097680 A1    May 11, 2006

(51) Int. Cl.
*G05D 3/00*    (2006.01)
*G03B 7/10*    (2006.01)

(52) U.S. Cl. ............... 318/468; 318/560; 318/685; 318/696; 396/244; 396/256; 396/259; 396/458; 396/459; 396/493

(58) Field of Classification Search ........... 396/6, 396/502
See application file for complete search history.

(56) References Cited

U.S. PATENT DOCUMENTS

| | | | | | |
|---|---|---|---|---|---|
| 2,956,491 | A | * | 10/1960 | Fischer et al. | 396/233 |
| 4,355,272 | A | * | 10/1982 | Wise | 318/561 |
| 4,363,532 | A | * | 12/1982 | Weber | 359/381 |
| 4,549,787 | A | * | 10/1985 | Tanner | 359/889 |
| 4,572,645 | A | * | 2/1986 | Yoshida et al. | 396/235 |
| 4,757,333 | A | * | 7/1988 | Baker et al. | 396/557 |
| 4,978,991 | A | * | 12/1990 | Farrington | 396/236 |
| 5,043,570 | A | * | 8/1991 | Takabayashi | 250/216 |
| 5,097,110 | A | * | 3/1992 | Hamada et al. | 219/121.63 |
| 5,116,329 | A | * | 5/1992 | Vannus et al. | 606/11 |
| 5,154,707 | A | * | 10/1992 | Rink et al. | 606/12 |
| 5,164,766 | A | * | 11/1992 | Morita | 355/71 |
| 5,173,728 | A | * | 12/1992 | Sangregory et al. | 396/454 |
| 5,309,198 | A | * | 5/1994 | Nakagawa | 355/67 |
| 5,528,431 | A | * | 6/1996 | Wilkins | 359/885 |
| 5,712,698 | A | * | 1/1998 | Poschenrieder et al. | 355/71 |
| 5,729,783 | A | * | 3/1998 | Depatie et al. | 396/508 |
| 5,745,814 | A | * | 4/1998 | Kanbayashi et al. | 396/460 |
| 5,768,649 | A | * | 6/1998 | Pearson | 396/529 |

(Continued)

OTHER PUBLICATIONS

"Electronic Shutters," Melles Griot, rendered in pdf Apr. 21, 2003 by Ester Cochran, copyright Apr. 2003, www.mellesgriot.com.*

(Continued)

*Primary Examiner*—Lincoln Donovan
*Assistant Examiner*—Robert W. Horn
(74) *Attorney, Agent, or Firm*—Sheppard Mullin Richter & Hampton LLP (57) ABSTRACT

A highly versatile optical shutter for industrial and scientific applications is disclosed. The has a aperture which defines a light path through the shutter, and a shutter vane or blade that is moved into and out of the light path using a precision, microprocessor controlled motor, such as a stepping motor. Preferably, the motor is mounted on the shutter housing using a shock absorbing material. A control unit associated with the shutter comprises the microprocessor, a motor driver, preferably one which is capable of microstepping the motor, and a non-volatile memory device, such as EEPROM, which stores a plurality of shutter control programs defining different trajectories of the shutter vane. Different programs may be used, for example, to maximize shutter speed or frequency, or to minimize vibrations.

28 Claims, 4 Drawing Sheets

U.S. PATENT DOCUMENTS

| | | | |
|---|---|---|---|
| 5,832,319 A * | 11/1998 | Seo | 396/90 |
| 5,839,881 A * | 11/1998 | Yu | 416/5 |
| 6,002,467 A * | 12/1999 | Nishi et al. | 355/61 |
| 6,072,958 A * | 6/2000 | Hasuda | 396/235 |
| 6,184,797 B1 * | 2/2001 | Stark et al. | 340/870.07 |
| 6,188,193 B1 * | 2/2001 | Michelson | 318/625 |
| 6,304,317 B1 * | 10/2001 | Taniguchi et al. | 355/55 |
| 6,388,414 B1 * | 5/2002 | Kobayashi | 318/685 |
| 6,411,368 B1 * | 6/2002 | Matsumoto et al. | 355/67 |
| 6,418,278 B1 * | 7/2002 | Bittner | 396/195 |
| 6,648,817 B2 * | 11/2003 | Schara et al. | 600/173 |
| 6,654,097 B1 * | 11/2003 | Nishi | 355/53 |
| 6,667,823 B2 * | 12/2003 | Greywall | 359/224 |
| 6,705,775 B2 * | 3/2004 | Mikami et al. | 396/458 |
| 6,710,563 B2 * | 3/2004 | Mizumaki et al. | 318/437 |
| 6,713,985 B2 * | 3/2004 | Aoshima | 318/696 |
| 6,716,219 B1 * | 4/2004 | Koch | 606/107 |
| 6,744,493 B1 * | 6/2004 | Johnson et al. | 355/71 |
| 6,754,302 B2 * | 6/2004 | Kitaoka | 378/34 |
| 6,762,866 B2 * | 7/2004 | Carra | 359/198 |
| 6,776,540 B2 * | 8/2004 | Toyoda | 396/484 |
| 6,798,989 B2 * | 9/2004 | Higuma | 396/135 |
| 6,805,500 B2 * | 10/2004 | Miyazaki | 396/484 |
| 6,873,524 B2 * | 3/2005 | Kaczeus et al. | 361/685 |
| 6,906,313 B2 * | 6/2005 | Hayashi | 250/235 |
| 6,917,696 B2 * | 7/2005 | Soenksen | 382/128 |
| 6,927,545 B2 * | 8/2005 | Belliveau | 315/294 |
| 6,929,410 B2 * | 8/2005 | Nguyen et al. | 396/463 |
| 6,953,927 B2 * | 10/2005 | Quake et al. | 250/234 |
| 6,995,359 B1 * | 2/2006 | Hillenbrand et al. | 250/252.1 |
| 7,005,824 B2 * | 2/2006 | Akiwa | 318/684 |
| 7,033,047 B2 * | 4/2006 | Gennrich et al. | 362/321 |
| 2001/0003559 A1 | 6/2001 | Toyoda et al. | 396/484 |
| 2006/0097680 A1 * | 5/2006 | Belgum et al. | 318/466 |
| 2006/0138991 A1 * | 6/2006 | Kawamoto et al. | 318/696 |

OTHER PUBLICATIONS

Patent Search, Nerac, Inc., Nov. 1, 2004.

* cited by examiner

INDUSTRIAL OPTICAL SHUTTER

BACKGROUND OF THE INVENTION

1. Field of the Invention

The present invention is related to optical shutters, and is specifically related to a precision controlled optical shutter for industrial and scientific applications.

2. Background

Optical shutters are used to switch the transmission of light on and off. Controlling light exposure in a camera is the most widespread and best-known shutter application, and the art associated with camera shutters is highly evolved to meet the specific needs of that use.

Shutters are also used in a wide range of other applications. Optical shutters used in scientific or industrial applications, hereinafter referred to as industrial shutters, are typically electronically controlled. Electronically controlled or actuated mechanical industrial shutters have been widely used in various optical applications for decades. They act quickly, they can be driven by simple electronics, and can be made quite thin. Industrial shutters generally give better light transmission when open, and better light attenuation when closed than other means of controlling light. Industrial shutters may be used to control transmission of light from a lamp or other source, or to protect sensitive materials from excess exposure to light. Such shutters are widely used in microscopy, for example, to control bleaching of dyes or pigments due to light exposure, or to select between multiple light sources or light paths, such as transmitted light versus fluorescence excitation.

Camera shutters are highly specialized and are generally designed as part of an integrated camera system, all the parts of which are designed to function together in a single application. On the other hand, industrial and scientific shutters are designed and sold as stand alone items which may used in a variety of applications by end users and, therefore, must be highly versatile and robust. Thus, the design and use of industrial shutters is significantly different than camera shutters.

The typical electronically controlled or actuated mechanical industrial shutter comprises a solenoid linked to one or more vanes that move into or out of a light path when the solenoid is activated. Normally, the solenoid action is opposed by a return spring, so that the vanes will return to a resting position when the current through the solenoid coil is turned off. The linkage of the solenoid to the vanes may be designed so that the solenoid acts either to open or to close the shutter. Such shutters are restricted to either fully open or fully closed positions.

In many industrial and scientific applications it is critical to provide very quick switching times, i.e., the time required to open or close the shutter. In order to obtain a fast open or close time, industrial shutters the vanes or blades and other moving parts of the shutter are made to be very light. In addition, in order to maximize the quickness of the solenoid action, typically the current to the solenoid coil is briefly increased to a level that, if sustained, could damage the coil. The combination of light construction and quick action associated with prior art industrial shutters results in the production of undesirable vibration and noise. In addition, while such shutters can produce short bursts of operation at frequencies above 20 Hertz, they are susceptible to overheating and failure if operated for extended periods at or near their optimum rate. Due to the light construction, these units fail frequently and, in order to obtain light but strong construction the components are typically spot-welded together, making repairs impractical. To avoid bouncing at the end of an opening or closing stroke and to reduce vibration and wear, mechanical dampers are employed. A typical damper comprises a bumper made of rubber or plastic attached at the end of a spring. Such dampers are subject to wear, requiring frequent replacement, and can stick to the shutter blade.

Solenoid shutters rely on a return spring to move the shutter vane to its resting position when current to the solenoid is removed. The action of the return spring is much slower than the solenoid. Accordingly, two versions of such shutters are normally made, normally open and normally closed. In order to provide a shutter which is equally fast opening and closing it would be necessary to use two solenoids, increasing the cost and complexity of the device.

SUMMARY OF THE INVENTION

Accordingly, there is a need for an improved, more robust industrial shutter design which has the versatility to be used in a variety of applications and in a variety of ways.

In one aspect the present invention comprises an industrial optical shutter having a positionally controllable motor, a shutter vane coupled to the motor, said shutter vane being contained within an enclosed housing having an aperture therethough defining a light path, a microprocessor for controlling the position of the shutter vane, and a non-volatile memory device coupled to said microprocessor, comprising a plurality of user-selectable control programs for defining the trajectory of said shutter vane. Preferably, the positionally controllable motor is a stepping motor, and the shutter system further comprises a motor driver, which may be of the microstepping type. Preferably, the motor is mounted on the housing with a shock absorbing material. The microprocessor and motor driver may be housed in a control unit which also has a keypad and display unit for accessing and selecting among the plurality of user-selectable control programs, one or more of the user-selectable control being adapted to allow the user to enter control parameters via said keyboard. Alternatively, the shutter control unit may connected to and operated using a computer. The user selectable programs may include programs maximizing shutter speed, frequency, smoothness of operation, or minimizing shutter vibration. In addition, the control unit preferably is configured to turn the motor off when the vane has reached a desired position in the light path to reduce noise or heat generation.

In a preferred embodiment, the shutter has only one shutter vane, which is controllably movable between a first position which does not obstruct the passage of light through said shutter aperture and a second position which substantially completely blocks all light from passing through said shutter aperture, and at least one of said user-selectable control programs brings said shutter vane to rest in a position intermediate said first and second positions, such that light passing through said shutter is partially blocked by said shutter vane.

The industrial optical shutter of the present invention is capable of generating output signal which are precisely coordinated with the position of the shutter vane, such that the polarity, delay and duration of the output signal are selectable by the user.

In another aspect, the present invention comprises a method using an industrial shutter having a shutter vane coupled to a motor controlled by a microprocessor, comprising selecting among a plurality of programs stored in non-volatile memory associated with the shutter to cause the microprocessor to implement a desired trajectory of the shutter vane.

DETAILED DESCRIPTION

According to the present invention, a precision controlled motor is used to actuate one or more shutter vanes. In order to properly position the shutter vane, the motor is controlled by a microprocessor in conjunction with suitable firmware and electronic hardware, or other means of programming. Use of a microprocessor controlled motor makes it is possible to obtain opening and closing times that are similar to commercially available solenoid-actuated shutters. Because the trajectory of the movement of the vane is controlled by the microprocessor, fast opening and closing times can be obtained without the need for mechanical damping and with much less vibration. The control microprocessor can be programmed for a variety of movement profiles that are suited for different shutter applications. Because the motion profile of the shutter is controlled by a microprocessor, the motion can be optimized for speed, smoothness or other desirable characteristics. In addition, the motor based shutter of the present invention can be opened and closed with equal speed.

Operation of the present invention does not require overdriving the windings of a solenoid, such that the motor-based industrial optical shutter of the present invention can maintain the maximum frequency of operation for millions of cycles without failure. Units have been tested for over 50 million cycles without failure. Moreover, the shutter of the present invention is made using few parts, any of which can be replaced in case of failure.

Figure 1:
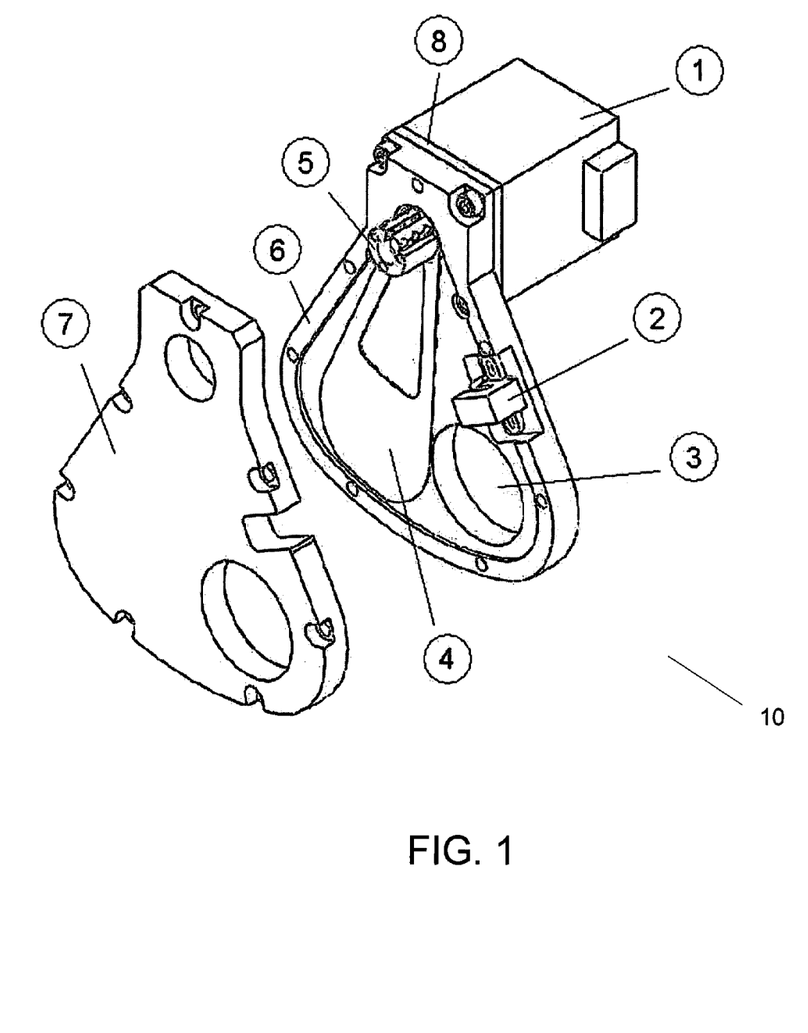
FIG. 1 is an exploded perspective view of a single-vane industrial optical shutter according to one embodiment of the present invention.

FIG. 1 depicts an exploded perspective view of a preferred embodiment of the industrial shutter of the present invention. Shutter 10 comprises a stepping motor 1 mounted on a housing 6. A hub 5 is mounted on the central shaft of motor 1 and extends from the central axis of the motor. Preferably, hub is removably mounted, as by clamping, to facilitate replacement if necessary. A vane 4 is mounted on hub 5. Vane 4 is located within housing 6, and is enclosed with a mating cover 7 that is removably mounted on the housing. When mounted together, housing 6 and cover 7 form a interior pocket which provides clearance for the free movement of vane 4 between a first or "open" position, in which the vane is completely out of the light path, and second or "closed" position, in which the vane completely blocks the light path. Housing 6 and cover 7 have apertures 3A and 3B formed therein, which are aligned when the cover is mounted on the housing thereby defining a light passage completely through the shutter when not obstructed by vane 4. Preferably, the combination of housing 6 and cover 7 is thin, for example, in the range of 5-15 mm.

Optionally, apertures 3A and 3B may have optically transparent coverings, such as round glass plates, mounted thereon to protect the inner workings of shutter 10. Preferably, any such covering are removable and easily replaceable. In a further aspect, such coverings can be interchangeable lens structures or filters which may be useful in particular shutter applications. In addition, a structure for reducing the size of the aperture can be used, as described in further detail below.

Vane 4 is shaped to completely block the passage of light through aperture 3 when rotated into the second or closed position. Hub 5 extends through and beyond another aperture in cover 7 such that the hub can be rotated by hand, if desired, when the motor is not powered. As depicted, the portion of shutter 10 which is designed to be placed in a light path is relatively thin so that it does not require any appreciable lengthening of the overall light path in the intended application.

In a preferred embodiment, a shock absorbing material, such as rubber gasket 8, is used for mounting motor 1 on housing 6. Isolating the motor from the remainder of the shutter mechanism using a shock absorbing material improves the overall performance of shutter 10. Specifically, the shock absorbing material reduces mechanical noise and vibration, and enables enhanced starting and stopping of the shutter vane. In addition, it is believed that the use of a shock absorbing material helps prolong the life of the motor and other shutter components. While rubber is used in one embodiment, those skilled in the art will appreciate that other materials with suitable shock absorbing qualities may be substituted. Likewise, while a gasket is shown to provide shock absorption between motor 1 and housing 6, other structures may be substituted for the same purpose. It is noted that the use of a shock absorbing material is beneficial notwithstanding the ability to program motor 1 to smoothly rotate shutter vane 4.

While a stepping motor is used in the preferred embodiment of the present invention, those skilled in the art that will appreciate that acceptable positional control and speed may also be obtained using a servo-motor with feedback control means for accurate positional monitoring, employing, for example, an optical encoder. A suitable stepping motor for use in the present invention may be obtained from Oriental Motor USA.

Figure 3:
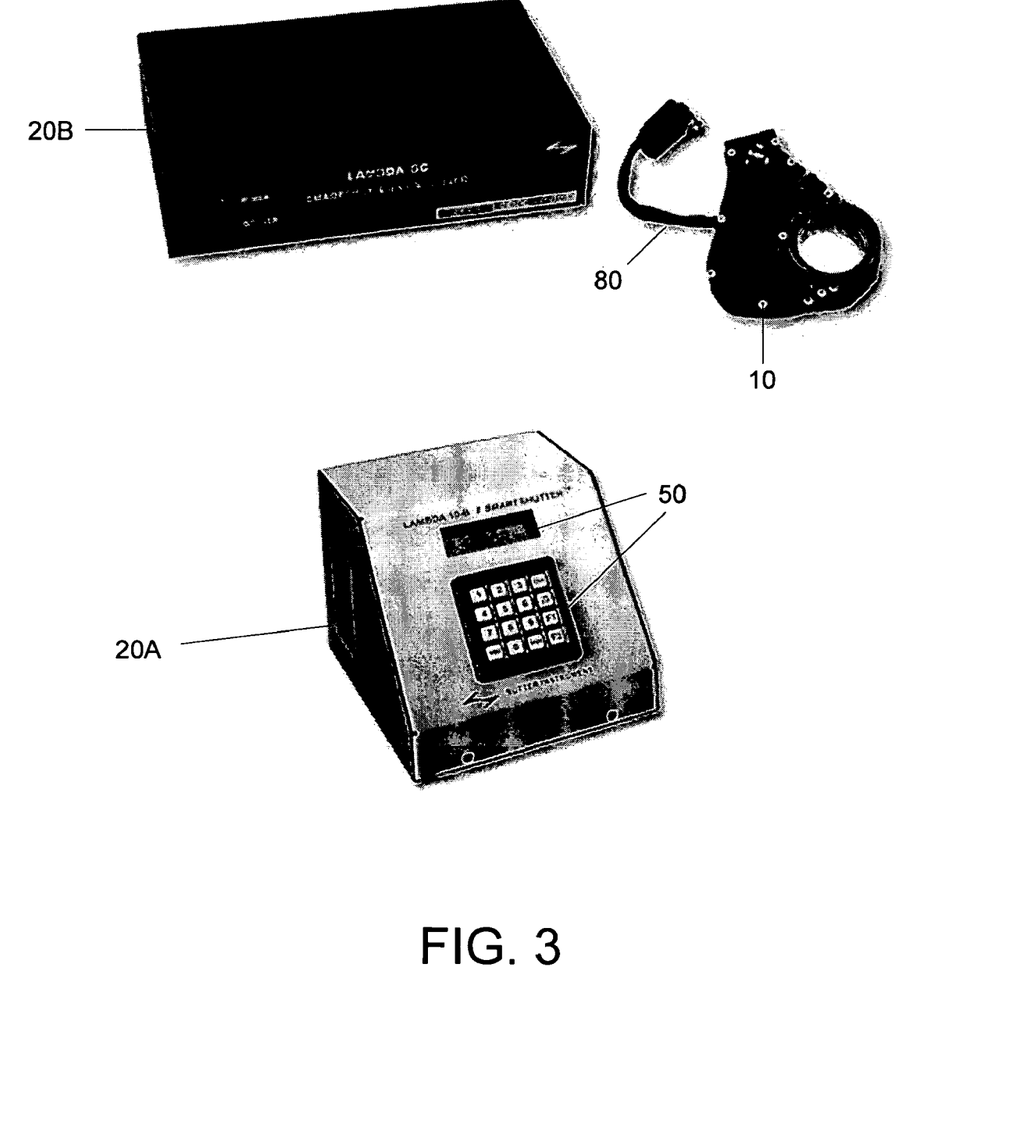
FIG. 3 is a perspective view of an embodiment of an industrial shutter of the present invention, showing two different control units.

Rotational movement of stepping motor 1, and thereby hub 5 and vane 4, is controlled by the control circuitry of FIG. 3, as described in further detail below. In a preferred embodiment, a sensor 2 is used to detect when vane 4 is in the closed position, i.e., when the vane entirely blocks the passage of light through aperture 3. In one embodiment, sensor 2 is a simple optical interrupt switch, and is used when power to shutter 10 is turned on to locate vane 4. Specifically, when power is applied to shutter 10, vane 4 is moved until it detected, and thereby located, by sensor 2. Currently available optical interrupt technology is permits the vane to be located with a very high degree of accuracy in this manner. Sensor 2 may also be used to verify that vane 4 is properly located in the closed position when instructed to do so. Optionally, an additional sensor can be positioned at the opposite side of shutter 10 to detect when the vane is in the fully open position.

Preferably, vane 4 has a very low mass so that it can be rotated into and out of position quickly. Accordingly, vane 4 is preferably made of a material, such as aluminum, which has suitable material properties. Shutter 10 is intended for use in a large variety of industrial and scientific applications and, therefore, must be highly versatile. In addition to being very rigid, vane 4 should be made of a material that can withstand exposure to high intensity lamps which may be used with the shutter. Many materials will warp or otherwise become deformed due to heat generated from the incidence of high intensity light. Aluminum has excellent reflectivity, such that less heat is produced, and has very good thermal conductivity, such that heat that is generated can be carried away from the exposed portion. In addition, aluminum is easily worked, such that it can be made very thin with ridges formed by machining or etching, if necessary, to enhance the rigidity. In addition, the components of shutter 10 are preferably made from relatively inert materials to resist the effects of any corrosive materials which may be present in various application environments.

In one embodiment, vane 4 has a cutout between the motor hub and the light-blocking portion, as depicted, to further reduce its mass. While vane 4 is shown having a general wedge shape, other shapes may be used depending on the application. In addition, although one shutter vane is preferred because of its simplicity, multiple vanes may be used. In some applications, a multiple vane system might provide the ability to open or close the shutter more quickly. Moreover, while the embodiment shown in FIG. 1 depicts a vane which is moved into and out of position by rotation motion, it will be appreciated that by using suitable linkage or gearing, stepping motor 1 could be adapted to control the positioning of one or more shutter vanes by linear motion instead.

Figure 2:
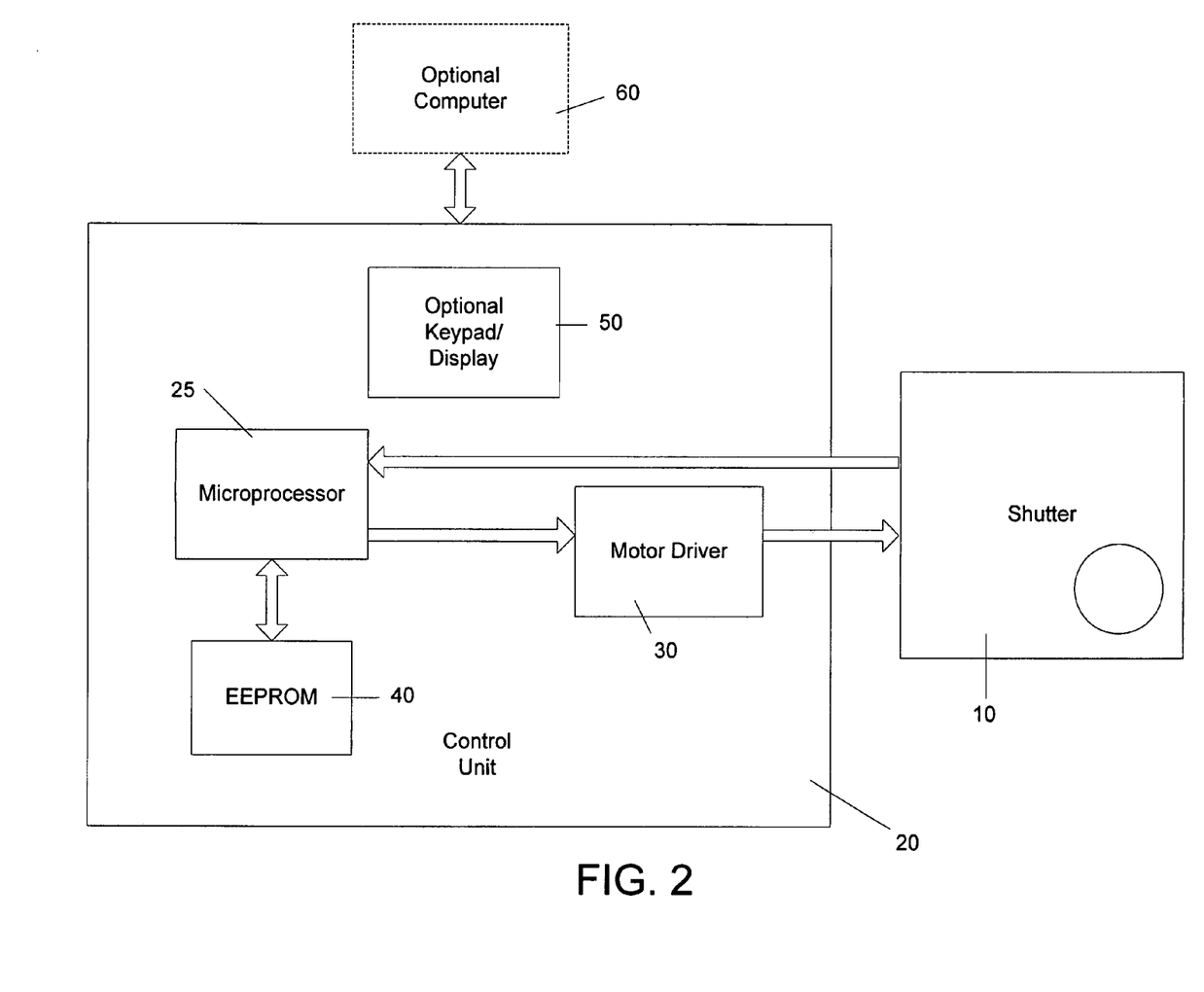
FIG. 2 is a schematic of an embodiment of the control circuitry for operating the industrial shutter of the present invention.

FIG. 2 is a schematic block diagram of the system for controlling the operation of shutter 10. A control unit 20 comprises a microprocessor 25 which generates and provides appropriate control signals to a motor driver chip 30 which, in turn, provides appropriate operational current to the stepping motor. The current waveform from motor driver 30, comprising a series of current pulses, is transmitted via cable 35. The microprocessor, in effect, instructs the motor driver to rotate the shaft of motor 1, and motor driver 30 delivers an appropriately shaped pulse of electrical current of sufficient magnitude to the correct motor windings. Specifically, the microprocessor positions the vane by repeatedly commanding the motor driver to step the motor in the desired direction until the correct number of steps has been taken. As described, the location of the vane is first determined during an initialization sequence implemented when the shutter power is turned on by moving the vane until it interrupts optical sensor 2. Preferably, optical sensor is located at the vane closed position, such that the sensor can also be used to verify when the shutter is closed. The use of a microprocessor and motor driver to precisely control the movement of a stepping motor is well known and need not be described in further detail. Preferably, motor driver 30 is of the type which provides micro-stepping of the motor for more precise and smooth motor control. A suitable micro-stepping motor driver for use with the aforementioned stepping motor may be obtained from Allegro Microsystems, Inc. of Worchester, Mass.

Detector 2 (as shown in FIG. 1), and any additional detectors incorporated into shutter 10, communicates signals to microprocessor 25 via cable 70. Control unit 20 also includes other standard devices and circuitry, such as a suitable power supply, which are well-known and need not be described.

Microprocessor 25 implements program instructions that are stored in EEPROM 40. EEPROM 40 and microprocessor 25 may be fabricated either on the same IC chip or as separate devices. While the use of EEPROM for storing program instructions is preferred, any suitable form of non-volatile memory may be used including, for example, ROM, PROM, EPROM, or optical or magnetic disk memory, etc. Modifiable memory devices are preferred. In accordance with a preferred embodiment of the present invention, EEPROM 40 stores a plurality of user-selectable control programs for operating shutter 10, thereby enhancing the versatility of the shutter. Thus, for example, various programs might be optimized to: (1) maximize the speed and/or frequency of shutter operation, (2) minimize vibration of the shutter while moving, (3) provide optimal smoothness of shutter operation, or (4) move the shutter vane partially into the light path and hold it there, as described in greater detail below. Each type of program may include user selectable options to control a "sync" or output signal from the shutter system to an external device to coordinate operation of the two devices.

Proper programming requires implementation of a carefully selected pattern of steps to achieve the desired result. Thus, a program which maximizes the shutter speed requires a pattern which not only minimizes the intervals between steps, but which also achieves maximum vane acceleration and rapid deceleration to a stable stopping position. A low vibration program selects step intervals which allow the effects of each step to damp out before the next step is taken. In addition, the drive current to the motor windings can be reduced to minimize the vibration produced by each step.

According to the present invention, some or all of such programs permit the user to input specific parameters to be employed during program implementation, for example, the frequency of shutter operation, the percentage of light blockage desired, or the duration, polarity, shutter starting position and/or stopping position associated with the output signal.

In one embodiment of the present invention, control unit 20 comprises keypad and display units 50. An example of such an embodiment is shown in FIG. 3 as control unit 20A. The key pad of control unit 20A allows the user to directly select among available programs, to enter specific parameters for implementing a particular program, and to otherwise operate the shutter of the present invention. In an alternative embodiment of the present invention, the control unit of the shutter of the present invention is housed in a "black box." An example of such an embodiment is shown in FIG. 3 as control unit 20B. The control unit of 20B is used with a computer 60 (see FIG. 2), which provides the user interface for selecting among programs, entering specific parameters, etc. Control unit 20B may communicate with computer 60 in any suitable manner, such as a USB or serial connection cable (not shown) attached to a mating I/O port on the computer. Even though control unit 20A has keypad and display units to enable independent operation, preferably it is also capable of being connected to and operated by a computer. In either case, shutter 10 comprises a cable 80 which is used to connect it to control unit 20. Cable 80 includes cable 35, which is used to send drive current from motor driver 30 to motor 1, and cable 70, which is used to send signals from detector 2 (and any other detectors) back to control unit 20.

It is contemplated that the industrial shutter of the present invention will be delivered to the end user with a plurality of programs already loaded into the system memory. However, from time-to-time it may be desirable to update programs that have already been loaded, or to add new programs. In accordance with another aspect of the invention, such updated or new programs is entered into the system EEPROM by connecting the control unit to a computer and transferring the information to the EEPROM using appropriate transfer software loaded on the computer. Specifically, the updated/new program to be transferred may, preferably, be downloaded from the supplier's internet "website" or other computer network. Alternatively, it may be distributed to the user on a non-volatile media, such as a "floppy" or optical disk, which is then accessed locally by user's computer to effect the transfer. While the programs provided with the inventive shutter are intended to provide a great deal of versatility, in accordance with yet another aspect of the present invention, users can develop their own control programs and load them into EEPROM using software programming tools provided by the shutter supplier.

Unlike the solenoid-driven shutters of the prior art, the motor-driven shutter of the present can be precisely moved into a partially closed position, such that a controllable portion of the light path through aperture 3 is blocked. By holding the shutter in such a position, the present invention can be used effectively as a neutral-density filter in conjunction with a suitable light guide fitted with collecting optics. When used in this way, the output intensity delivered by the light guide can be attenuated without significantly changing the spatial distribution or composition of the output, thereby producing a programmable attenuation of the light transmitted through the shutter.

When using the motor driven shutter of the present invention, shutter vane 4 will stay in position if the motor is turned off, i.e., the motor driver stops delivering current to the motor. Thus, according to another aspect of the present invention, the shutter vane is moved into position to partially block the light path, as described, and current to the motor is then turned off. It may be desirable to turn the motor current off, for example, to reduce electrical noise associated with the pulse train transmitted to the motor while it is on, or to reduce thermal effects associated with the current flow. In some applications, for example, when making highly sensitive measurements, reduction of potentially interfering electrical noise or heat is very important. As described above, when the motor is off, shutter vane 4 can be moved by hand, if necessary, to a fully open or fully closed position.

Shutters of all types are typically designed to provide a sync or other output signal such that the shutter action can be coordinated with another event or device. Thus, camera shutters are designed to send a sync signal to trigger a flash, in order to ensure that the flash is activated while the shutter is open. In industrial shutters, such output signals are used for a variety of different purposes and may be more complex than a simple signal to trigger a flash device. According to the present invention, the ability of the control system to accurately know the position of the shutter vane throughout its trajectory enables greater control over the output signals. Specifically, the position of shutter vane 4 at any point in time is determined by microprocessor 25, and the microprocessor can generate output signals related to any position of the shutter. Thus, an output signal of almost any desired shape, duration or frequency can be turned on or off at any desired position of shutter vane 4. A simple sync signal can be generated when the shutter is fully opened or closed, at any desired point in the opening or closing movement of the shutter vane, or predetermined period of time after the shutter is fully open. When the output signal is used to control exposure time, for example of a camera attached to a microscope, this capability enables the user to have greater control over the of light delivered through the shutter aperture. When full exposure is important the output signal can be transmitted only when the shutter is fully open. If, on the other hand, the total light dose is important the output signal may be activated for all or a portion of the time the shutter is opening and closing.

Figure 4:
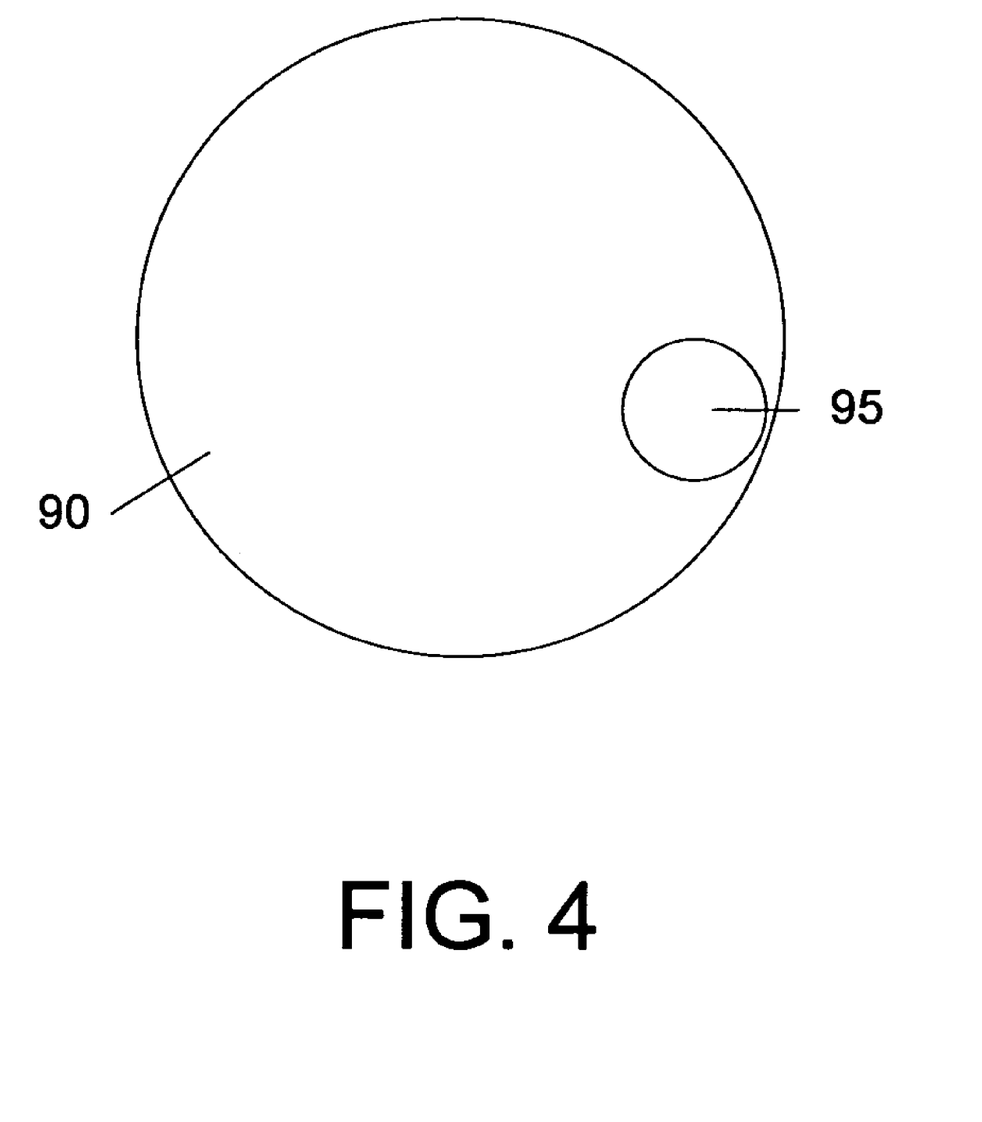
FIG. 4 is a cover for reducing the size of the aperture of the present invention.

Industrial shutters typically have a aperture of 25 mm or more. However, for applications using lasers, a shutter with an apertures in the range of 1 to 5 mm in diameter is more desirable. FIG. 4 depicts an insert 90 which is adapted to be attached to aperture 3. Insert 90 can be attached by any suitable mounting technique, such as screwing or snapping into position over aperture 3, and has a small aperture 95, at the circumference thereof, that is used to adapt the shutter of the present invention to have a much smaller aperture size. By attaching cover 90 to a 25 mm (or more) shutter, it is readily converted into a 5 mm (or less) shutter. By positioning small aperture 95 at the circumference of cover 90, the shutter "closed" position will remain unchanged, simplifying control of the reduced aperture shutter. Preferably, one such insert is placed over both apertures 3A and 3B, i.e., on both sides of the shutter. While both the large and small apertures are depicted as being round, other shapes are possible. According to the invention, the insert has a relatively small aperture with an average diameter which is less than the average diameter of the shutter aperture. The inserts of the present invention can be easily fabricated as stamped metal disks.

The embodiments described above are illustrative of the present invention and are not intended to limit the scope of the invention to the particular embodiments described. Accordingly, while one or more embodiments of the invention have been illustrated and described, it will be appreciated that various changes can be made therein without departing from the spirit or essential characteristics thereof. Accordingly, the disclosures and descriptions herein are intended to be illustrative, but not limiting, of the scope of the invention, which is set forth in the following claims.

What is claimed is:

1. An industrial optical shutter comprising:
   a positionally controllable motor,
   a shutter vane coupled to said motor, said shutter vane being contained within an enclosed housing, said housing having two substantially parallel surfaces, each of said surfaces having an aperture therethough, said apertures being aligned to define a light path through the housing,
   a microprocessor for controlling the position of said shutter vane,
   a non-volatile memory device coupled to said microprocessor, said memory device comprising a plurality of user-selectable control programs for defining the trajectory of said shutter vane.

2. The industrial optical shutter of claim 1 wherein said positionally controllable motor is a stepping motor, and further comprising a motor driver.

3. The industrial optical shutter of claim 2 wherein said motor driver is of the microstepping type.

4. The industrial optical shutter of claim 1 further comprising a keypad and display unit for accessing and selecting among said plurality of user-selectable control programs.

5. The industrial optical shutter of claim 4 wherein at least one of said user-selectable control programs is adapted to allow the user to enter control parameters used by said program via said keyboard.

6. The industrial optical shutter of claim 1 wherein one of said user-selectable control programs is for maximizing shutter speed.

7. The industrial optical shutter of claim 1 wherein one of said user-selectable control programs minimizes shutter vibration.

8. The industrial optical shutter of claim 1 having only one shutter vane, said shutter vane being controllably movable between a first position which does not obstruct the passage of light through said housing and a second position which substantially completely blocks all light from passing through said housing.

9. The industrial optical shutter of claim 8 wherein at least one of said user-selectable control programs is adapted to bring said shutter vane to rest in a position intermediate said first and second positions, such that light passing through said housing is partially blocked by said shutter vane.

10. The industrial optical shutter of claim 1 wherein said motor is mounted on said housing with a shock absorbing material.

11. The industrial optical shutter of claim 1 wherein at least one of said user-selectable programs generates an output signal based on the position of the shutter vane.

12. The industrial optical shutter of claim 11 wherein the polarity, delay or duration of said output signal is selectable by said user.

13. The industrial optical shutter of claim 1 further comprising a connector for coupling said shutter to an external computer, such that said shutter is controllable by said computer via said connector.

14. The industrial optical shutter of claim 1 wherein at least one of said user selectable programs turns said motor off after said vane has reached a desired position.

15. The shutter of claim 1 wherein said shutter vane is made of aluminum.

16. The shutter of claim 1 wherein said shutter is substantially flat in the vicinity of said aperture and has thickness in the vicinity of said aperture of less than about 10 mm.

17. An industrial optical shutter, comprising,
a shutter housing having two substantially parallel surfaces, each of said surfaces having an aperture therethrough, said apertures being aligned to define a light path through the housing,
a stepping motor mounted on said shutter housing using a shock absorbing material,
a microprocessor coupled to said motor via a motor driver for controlling operation of said motor,
a shutter vane positioned within said housing coupled to said motor, said shutter vane being movable into and out of said light passage.

18. An industrial optical shutter, comprising,
a shutter housing having two substantially parallel surfaces, each of said surfaces having an aperture therethrough, said apertures being aligned to define a light path through the housing,
a stepping motor mounted on said shutter housing,
a microprocessor coupled to said motor via a motor driver for controlling operation of said motor,
a shutter vane positioned within said housing coupled to said motor, said shutter vane being movable into and out of said light passage, and
a position detector for locating the position of said shutter vane.

19. The industrial optical shutter of claim 18 further comprising non-volatile memory coupled to said microprocessor, said non-volatile memory comprising a plurality of user-selectable programs for controlling the trajectory of said shutter vane.

20. The industrial optical shutter of claim 18 further comprising a keypad unit coupled to said microprocessor.

21. A method of operating a microprocessor controlled, motor-driven industrial optical shutter having a shutter vane within a housing between two substantially parallel surfaces and which is movable into and out of a light path through the housing, said light path being defined by apertures in said housing surfaces, comprising, selecting one of a plurality of shutter programs stored in memory coupled to said microprocessor, wherein at least one of said shutter programs operates to position said shutter vane partially in the light path such that a portion of the light passes through the housing and the remaining portion of the light is blocked by the shutter vane.

22. The method of claim 21 further comprising the step of inputting control parameters to be implemented by said selected program.

23. The method of claim 22 wherein said steps of selecting a program and inputting control parameters are performed using a keypad mounted on a shutter control unit.

24. The method of claim 22 wherein said steps of selecting a program and inputting control parameters are performed using an external computer connected to said shutter.

25. A method of using an industrial optical shutter as a neutral density filter, said industrial optical shutter comprising a housing having two substantially parallel surfaces, each of said housing surfaces comprising an aperture, said apertures being aligned to define a light path through the housing, comprising the steps of:
using a microprocessor controlled motor to move a shutter vane into a position which blocks a portion of the light traveling in said light path,
holding said vane in said position whereby a proportion of the light is blocked,
collecting the light passing through said shutter,
redistributing the collected light,
delivering the redistributed light to a desired location, such that the delivered light has substantially the same spatial distribution and spectral composition as the light incident on said shutter, but with reduced intensity.

26. The method of claim 25, further comprising the step of mounting an insert over a first of said apertures, wherein said first aperture has a first average diameter, said insert having a second aperture of a second average diameter, where said second average diameter is less than said first average diameter.

27. The method of claim 26 wherein said second aperture is positioned adjacent to a peripheral edge of said insert.

28. The method of claim 26 wherein said second average diameter is less than or equal to one fifth of said first average diameter.

* * * * *